United States Patent [19]

Markusch et al.

[11] 3,981,831

[45] Sept. 21, 1976

[54] INORGANIC-ORGANIC PLASTIC

[75] Inventors: Peter Markusch, Cologne; Dieter Dieterich, Leverkusen, both of Germany; Helmut Reiff, New Martinsville, W. Va.

[73] Assignee: Bayer Aktiengesellschaft, Leverkusen, Germany

[22] Filed: Nov. 26, 1974

[21] Appl. No.: 527,474

[30] Foreign Application Priority Data

Nov. 30, 1973 Germany............................ 2359612

[52] U.S. Cl.................... 260/2.5 AM; 260/2.5 AK; 260/29.2 TN; 260/37 N; 260/77.5 AM; 260/77.5 MA
[51] Int. Cl.$^2$................. C08G 18/14; C08G 18/30; C08G 3/34
[58] Field of Search................. 260/2.5 K, 29.2 TN, 260/37 N, 2.5 AM, 77.5 AM, 77.5 MA

[56] References Cited
UNITED STATES PATENTS

| | | |
|---|---|---|
| 1,999,382 | 4/1935 | Weygandt............................ 106/65 |
| 2,946,112 | 7/1962 | Tucker................................. 264/63 |
| 3,419,533 | 12/1968 | Dieterich...................... 260/29.2 TN |
| 3,479,310 | 11/1969 | Dieterich.......................... 260/37 N |
| 3,491,050 | 1/1970 | Keberle........................ 260/29.2 TN |
| 3,510,323 | 5/1970 | Wismer.......................... 260/2.5 AK |
| 3,607,794 | 9/1971 | Abbotson...................... 260/2.5 AK |
| 3,634,342 | 1/1972 | Boblitt........................... 260/2.5 AK |
| 3,655,600 | 4/1972 | Stevens......................... 260/2.5 AK |
| 3,833,386 | 9/1974 | Wood............................. 260/2.5 AK |

FOREIGN PATENTS OR APPLICATIONS 1,137,465    12/1968    United Kingdom

*Primary Examiner*—C. Warren Ivy
*Attorney, Agent, or Firm*—Joseph C. Gil; Gene Harsh

[57] ABSTRACT

A process is provided for making an inorganic-organic plastic having improved compression strength, elasticity, dimensional stability to heat and flame resistance wherein an organic polyisocyanate is reacted with an aqueous solution of an alkali metal silicate or aqueous silica sol in a mixture containing an organic amphiphilous compound having 1 to 9 carbon atoms, such as an alcohol. The product may be used as a constructional component of a building.

17 Claims, No Drawings

INORGANIC-ORGANIC PLASTIC

It is known to produce polyurethane and polyurea plastics form organic polyisocyanates and organic compounds which contain active hydrogen atoms. The properties of this class of polymers can be widely varied. Among the properties which are particularly highly valued in these substances are their high strength, elasticity and wear resistance. However, their thermostability, and, in particular, their long term endurance of temperatures above 120°C, is only moderate. Moreover, the use of these products as building and constructional elements is restricted by their unfavorable fire resistance characteristics. Although these characteristics may be improved by adding flame retarding agents, the mechanical properties are usually adversely affected thereby.

It is known to produce inorganic silica gel plastics from aqueous solutions of alkali metal silicates by the action of (potential) acids. These materials have gained importance especially in their use as putties and surface coatings. Lightweight foam plastics based on water glass have also been produced. These products have high dimensional stability when heated and are completely incombustible, but they are brittle and have relatively little strength. These foams are unable to withstand substantial loads and crumble under pressure.

It would be extremely desirable to combine the advantageous properties of inorganic and organic plastics materials and, at the same time to suppress the negative properties.

Accordingly, there has been no lack of effort to produce combination organic-inorganic plastics but the objective has so far not been achieved.

For example, in one such attempt, polyurethanes have been mixed with active silicic acid and a filler and then vulcanized. A certain reinforcing effect is observed, similar to that obtained when highly active carbon black is used, namely the tensile strength and modulus increase and the elongation at break decreases. The addition of silica, however, does not fundamentally alter the overall properties of the material, probably because the material is a two-phase system in which only the polyurethane forms a coherent phase in which the silica is merely embedded as an incoherent phase. The incoherent zones have diameters of the order of from 3 to 100$\mu$. Therefore, one is dealing with relatively coarse heterogenous diphasic systems. The interaction between the two phases is only slight, both on account of the relatively small interfaces and on account of the widely differing chemical nature of the two phases.

It has also been proposed to use silicic acid in a microfibrous form. A greater reinforcing effect is thereby obtained due to the specific morphology but, on the other hand, the incoherent zones are inevitably larger so that the chemical interaction between the two phases, if anything decreases. The fundamental character of a coarse heterogeneous two-phase synthetic resin remains.

It has also been proposed to react an aqueous solution of an alkali metal silicate (water glass) with a low molecular weight polyisocyanate, e.g. 4,4'-diphenylmethane diiosocyanate. In most cases, this reaction gives rise to foams in which the water present causes the isocyanate phase to react, the resulting carbon dioxide foaming up inside the mass and some of the carbon dioxide reacting with the surrounding aqueous silicate phase, this reaction being accompanied by gelling of the interface.

This reaction is preferably carried out with the water glass in excess so that the resulting mixture is an emulsion of the isocyanate in a coherent silicate solution. Therefore, the resulting foam has the character of a silicate foam which contains incoherent, foamed polyurea zones. The properties of such a foam do not differ substantially from those of a pure silicate foam. In fact, the foams obtained in this way are brittle and are only able to withstand slight mechanical loads.

Similar effects are also obtained with other isocyanates, e.g. cyclohexylisocyanate, phenylisocyanate, hexamethylene diisocyanate, diphenylmethane-2,4-diisocyanate, tolylene diisocyanate and also adducts of these isocyanates with low molecular weight glycols, e.g. ethylene glycol, propylene glycol, butane-1,4-diol, hexane-1,6-diol, neopentyl glycol, glycerol and trimethylolpropane. Although the organic isocyanate group containing component which is added to the silicate solution acts as a hardener, it has little influence on he properties of the resulting foam and frequently even has an adverse effect. The organic component obviously exists mainly as a filler in the finished silicate structure.

Alternatively, if an excess of diisocyante is used, the polyurea foams obtained have an incoherent silicate phase dispersed therein. Therefore, the properties are mainly those of a polyurea foam filled with silica, so that the products are highly combustible and extremely brittle.

If one proceeds in accordance with this teaching, (DOS No. 1,770,384), it is observed that mixtures of aqueous sodium silicate solutions and diphenylmethane diisocyanate form only relatively coarse emulsions. This disadvantage may, however, be greatly reduced by the recommended addition of emulsifiers or foam stabilizers which enable more finely divided and more stable primary emulsions to be obtained.

Nevertheless, the overall properties are unsatisfactory and in particular the combination plastics obtained are very brittle and have little strength. From previous results it must be concluded that combination plastics based on silicates and organic materials have no decisive advantages over purely organic or purely inorganic materials.

It is an object of this invention to provide a process for making substantially homogeneous inorganic-organic plastics having properties which are an improvement over either wholly organic or wholly inorganic plastics. Another object of this invention is to provide an organic-inorganic plastic having high strength, elasticity, dimensional stability when heated and good flame resistance.

The foregoing objects and others are accomplished in accordance with this invention, generally speaking, by providing a process for making inorganic-organic plastics wherein an organic polyisocyanate, an aqueous solution of an alkali metal silicate or aqueous silica sol and an organic amphiphilous compound having 1 to 9 carbon atoms, a molecular weight of 32 to about 400, and containing a hydroxyl group or at least one other hydrophilic or polar group are mixed together to form a sol which reacts to form a xerosol.

A process has now been found which enables macroscopically completely homogeneous inorganic-organic plastics to be obtained which constitute solid/solid xerosols similar to the known ABS plastics. The novel composite materials obtained in this way are extremely high quality plastics whose properties show improvements over wholly organic as well as wholly inorganic materials. In particular, they are distinguished by their high strength, elasticity, dimensional stability when heated and flame resistance.

It has now surprisingly been found that inorganic-organic plastics characterized by high strength, elasticity, dimensional stability to heat and flame resistance are obtained when organic polyisocyanates are substantially uniformly mixed with aqueous solutions of alkali metal silicates and/or aqueous silica sols in the presence of at least one special organic amphiphilous compound which contains from 1 to 9 carbon atoms, the resulting sol being left to react to form a xerosol. These compounds have the character of additives or carriers but are not emulsifiers, protective colloids or surface active agents.

The addition according to the invention of amphiphilous low molecular weight compounds has a desirable influence on the colloid chemical character of the primary emulsion formed by mixing the reactants and substantially improves the properties of the inorganic-/organic plastics obtained as end-product.

In particular, the additive component according to the invention has the effect of increasing the phase interface and improves the foaming properties as well as resulting in products which have a higher compression strength and a better cell structure.

In many cases, sufficient foaming for technical purposes is not obtained without the addition of these amphiphilous compounds. These effects are extremely surprising in view of the fact that the compounds used are not surface active agents in the usual sense, in other words they are neither emulsifiers nor wetting agents. As is well known, wetting agents contain hydrophobic $C_{10}$–$C_{30}$, and in particular $C_{12}$–$C_{18}$, chains and by virtue of this property they form mycellae in an aqueous medium.

It has already been proposed to add substances of this type, e.g. commercial emulsifiers, to combinations of isocyanates and water glass.

The addition of emulsifiers, e.g. in the form of alkylaryl sulphonates, in fact also results in an increase in the interface area and hence, for example, an increase in the reaction velocity.

In addition to the desired effect, however, these emulsifiers produce numerous disadvantages, especially if added in larger amounts:

1. they favor the formation of oil-in-water (O/W) emulsions instead of water-in-oil (W/O) emulsions which have much more suitable properties;
2. they impair the quality of the cell structure;
3. they have a marked deleterious effect on the mechanical properties and in particular on the compression strength.

The conventional emulsifiers appear to reduce the interaction between organic and inorganic phases due to concentration at the interface.

On the contrary, short chain amphiphilous compounds used according to this invention rather tend to reinforce this interaction.

An exact explanation for this surprising effect has not yet been found but is is assumed that a type of carrier effect takes place rather as in the case of lyotropic substances. The products which are preferably added to the isocyanate component may be solubilized therein with the hydrophobic radical while hydrophilic molecular portions enable the interaction with the aqueous phase to take place. The effect therefore corresponds, more or less, to a modification of the non-polar polyisocyanate with hydrophilic or polar groups. Compared with a modification in the normal sense, however, the difference resides in the fact that, in the present case, the "modification" comes about as a solubilizing action by way of side valencies.

No chemical reaction need take place between the amphiphilous additive and the polyisocyanate in order that the above-described effects may occur.

If a reaction with isocyanate is possible, e.g. in the case of alcohols, carboxylic acids or sulphonic acids, the additive is advantageously added only shortly before the two main components are mixed or, alternatively, it may first be mixed with the silicate component. This ensures that most of the amphiphilous component added is in its free form at the time when mixing is carried out.

The possibility of a certain activity in the form of the modified isocyanate even after the reaction with the isocyanate cannot be excluded but since the hydrophilic character of the urethane group is considerably weaker than that of the hydroxyl group and, moreover, the functionality of the isocyanate is reduced in a chemical reaction, such a reaction should be excluded as far as possible in the present process, and this may easily be achieved by the procedural measures indicated above.

It is particularly advantageous to use the amphiphilous compounds according to the invention in combination with very small quantities of conventional emulsifiers. By means of such combinations, it is possible to utilize the effect which emulsifiers have of increasing the area of the interface without the above-mentioned disadvantages of emulsifiers having any effect.

The process is particularly easy to carry out with prepolymers which contain isocyanate end groups, these prepolymers being preferably from organic polyisocyanates.

The organic amphiphilous compounds used according to the invention enable such a homogeneous distribution of the organic and aqueous inorganic phase to be achieved that sols in which the disperse phase has particle dimensions of from 20 nm to $20\mu$ and preferably from 50 nm to $1\mu$ are obtained, so that the chemical interactions increase by orders of magnitude and new types of composite materials are obtained. In particular, the addition of the amphiphilous organic compound according to the invention also enables a colloidal fibrous structure to be produced so that the two phases may exist as coherent systems. This means that a macroscopically homogeneous and, in many cases, even a microscopically homogeneous, composite material is obtained which combines the advantages of both inorganic and organic plastics.

This invention therefore, provides a process for producing inorganic-organic plastics which are characterized by high strength, elasticity, dimensional stability and flame resistance, and which consist of a polyurea-polysilicic acid composite material existing as a colloidal xerosol, by mixing:

a. an organic, preferably aromatic polyisocyanate or polyisothiocyanate;

b. an aqueous silicate solution and/or an aqueous silica sol; and c. an organic additive;
and, optionally, also other auxiliary agents and additives, and leaving the resulting system to react, characterized in that the organic additive (c) is an amphiphilous compound which contains from 1 to 9 carbon atoms, has a molecular weight of from 32 to 400 and contains one OH group or at least one other hydrophilic and/or polar group.

The proportion, by weight, of component (a) to component (b) is preferably from 70:30 to 20:80, and the quantity of component (c) is from 1 to 30 percent, by weight, preferably from 2 to 20 percent, by weight, based on component (a).

In the process according to the invention, therefore, novel plastics are produced from at least three components:

1. an organic polyisocyanate;
2. an aqueous alkali metal silicate solution and/or a silica sol; and
3. one of the above-mentioned organic amphiphilous compounds containing 1 to 9 carbon atoms.

Component (a)

a. Any suitable organic polyisocyanate may be used according to the invention including aliphatic, cycloaliphatic, araliphatic, aromatic and heterocyclic polyisocyanates such as those described e.g. by W. Siefken in Justus Liebigs Annalen der Chemie, 562 pages 75 to 136, for example, ethylene diisocyanate, tetramethylene-1,4-diisocyanate, hexamethylene-1,6-diisocyanate, dodecane-1,12-diisocyanate, cyclobutane-1,3-diisocyanate, cyclohexane-1,3- and -1,4-diisocyanate and any mixtures of these isomers, 1-isocyanato-3,3,5-trimethyl-5-isocyanatomethyl-cyclohexane, (U.S. Pat. No. 3,401,190), hexahydrotolylene-2,4- and -2,6-diisocyanate and any mixtures of these isomers, hexahydrophenylene-1,3- and/or 1,4-diisocyanate, perhydrodiphenylmethane-2,4'- and/or 4,4'-diisocyanate, phenylene-1,3 and -1,4-diisocyanate, tolylene-2,4- and 2,6-diisocyanate and any mixtures of these isomers, diphenylmethane-2,4'- and/or 4,4'-diisocyanate, naphthylene-1,5-diisocyanate, triphenylmethane-4,4',-4''-triisocyanate, polyphenyl-polymethylene polyisocyanates of the kind which may be obtained by anilineformaldehyde condensation followed by phosgenation and which have been described e.g. in British Pat. Specification No. 874,430 and 848,671, perchlorinated arylpolyisocyanates such as those described e.g. in German Auslegeschrift No. 1,157,601 polyisocyanates which contain carbodiimide groups as described in German Pat. No. 1,092,007, the diisocyanates described in U.S. Pat. No. 3,492,330, polyisocyanates which contain allophanate groups as described e.g. in British Pat. No. 994,890, in Belgian Pat. No. 761,626 and in published Dutch patent application No. 7,102,524, polyisocyanates which contain isocyanurate groups as described e.g. in German Pat. Nos. 1,022,789 and 1,027,394 and in Britsh Pat. Nos. 1,091,949, 1,267,011 and 1,305,036, polyisocyanates which contain urethane groups as described e.g. in Belgian Pat. No. 752,261 or in U.S. Pat. No. 3,394,164 polyisocyanates which contain acylated urea groups according to U.S. Pat. No. 3,517,139, polyisocyanates which contain biuret groups as described e.g. in German Pat. No. 1,101,394, in British Pat. No. 889,050 and in French Pat. No. 7,017,514 polyisocyanates prepared by telomerization reactions as described e.g. in Belgian Pat. No. 723,640, polyisocyanates which contain ester groups such as those mentioned e.g. in British Pat. Nos. 956,474 and 1,086,404 and in U.S. Pat. Nos. 3,281,378 and 3,567,763 and reaction products of the above-mentioned isocyanates with acetals according to German Pat. No. 1,072,385.

The distillation residues which are obtained from the commercial production of isocyanates and still contain isocyanate groups may also be used, optionally dissolved in one or more of the above-mentioned polyisocyanates. Mixtures of the above-mentioned polyisocyanates may also be used.

It is generally preferred to use commercially readily available polyisocyanates, e.g. tolylene-2,4- and -2,6-diisocyanate and any mixtures of these isomers, ("TDI"), polyphenyl-polymethylene-isocyanates obtained by aniline-formaldehyde condensation followed by phosgenation, ("crude MDI"), and polyisocyanates which contain carbodiimide groups, urethane groups, allophanate groups, isocyanurate groups, urea groups, imide groups or biuret groups, ("modified polyisocyanates").

If the amount of component (c) added is not sufficient for the required extremely finely divided emulsions, especially if quantities below 1%, by weight, based on the total solids content, are used, one may, of course, add organic polyisocyanates which are modified with ionic groups, for example, with carboxyl and/or carboxylate groups and/or sulphonic acid groups and/or sulphonate groups. A certain proportion of non-ionic hydrophilically modified organic polyisocyanates may, of course, also be included.

Reaction products of from 50 to 99 mols of aromatic diisocyanates with from 1 to 50 mol of conventional organic compounds with a molecular weight of, generally, from about 400 to about 10,000 which contain at least two hydrogen atoms capable of reacting with isocyanates may also be used. While compounds which contain amino groups, thiol groups or carboxyl groups may be used, it is preferred to use organic polyhydroxyl compounds, in particular compounds which contain from 2 to 8 hydroxyl groups, especially those with a molecular weight of from about 800 to about 10,000 and preferably from about 1,000 to about 6,000, e.g. polyesters, polyethers, polythioethers, polyacetals, polycarbonates or polyester amides containing at least 2, generally from 2 to 8 but preferably from 2 to 4 hydroxyl groups, of the kind known for producing homogeneous and cellular polyurethanes.

The hydroxyl group-containing polyesters may be, for example, reaction products of polyhydric alcohols, preferably dihydric alcohols, with the optional addition of trihydric alcohols, and polybasic, preferably dibasic, carboxylic acids. Instead of the free polycarboxylic acids, the corresponding polycarboxylic acid anhydrides or corresponding polycarboxylic acid esters of lower alcohols or their mixtures may be used for preparing the polyesters. The polycarboxylic acids may be aliphatic, cycloaliphatic, aromatic and/or heterocyclic and may be substituted, e.g. with halogen atoms, and may be unsaturated. Examples include: succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydropthalic acid anhydride, glutaric acid anhydride, maleic acid, maleic acid anhydride, fumaric acid, dimeric and trimeric fatty acids such as oleic acid, optionally mixed with monomeric fatty acids, dimethylterephthalate and bis-glycol terephthalate. Any suitable polyhydric alcohol may be used such as, for example, ethylene glycol, propylene-1,2- and -1,3-glycol, butylene-1,4- and -2,3-glycol, hexane-1,6-diol, octane1,8-diol, neopentyl glycol, cyclohexanedimethanol-(1,4-bis-hydroxymethylcyclohexane), 2-methyl-propane-1,3-diol, glycerol, trimethylol propane, hexane-1,2,6-triol, butane-1,2,4-triol, trimethylol ethane, pentaerythritol, quinitol, mannitol and sorbitol, methylglycoside, diethylene glycol, triethylene glycol, tetraethyleneglycol, polyethyleneglycols, dipropyleneglycol, polypropylene glycols, dibutylene glycol and polybutylene glycols. The polyesters may also contain a proportion of carboxyl end groups. Polyesters of lactones, such as $\epsilon$-caprolactone, or hydroxycarboxylic acids, such as $\omega$-hydroxy-caproic acid, may also be used.

The polyethers with at least 2, generally from 2 to 8 and preferably 2 or 3 hydroxyl groups used according to the invention are known and may be prepared e.g. by the polymerization of epoxides, e.g. ethylene oxide, propylene oxide, butylene oxide, tetrahydrofuran, styrene oxide or epichlorohydrin, each with itself, e.g. in the presence of $BF_3$, or by addition of these epoxides, optionally as mixtures or successively, to starting components which contain reactive hydrogen atoms such as alcohols or amines, e.g. water, ethylene glycol, propylene-1,3- or -1,2-glycol, triemthylolpropane, 4,4'-dihydroxydiphenylpropane, aniline, ammonia, ethanolamine or ethylenediamine. Sucrose polyethers such as those described e.g. in German Auslegeschriften Nos. 1,176,358 and 1,064,938 may also be used according to the invention. It is frequently preferred to use polyethers which contain predominantly primary OH groups, (up to 90% by weight, based on the total OH group content of the polyether). Polyethers modified with vinyl polymers such as those which may be obtained by polymerizing styrene or acrylonitrile in the presence of polyethers, (U.S. Pat. Nos. 3,383,351; 3,304,273; 3,523,093 and 3,110,695 and German Pat. No. 1,152,536), and polybutadienes which contain OH groups are also suitable.

By "polythioethers" are meant, in particular, the condensation products of thiodiglycol with itself and/or with other glycols, dicarboxylic acids, formaldehyde, aminocarboxylic acids or amino alcohols. The products obtained are polythio-mixed ethers, polythioether esters or polythioether ester amides, depending on the cocomponent.

The polyacetals used may be, for example, the compounds which may be obtained from glycols, e.g. diethylene glycol, triethylene glycol, 4,4'-dihydroxydiphenyldimethylmethane, hexanediol, and formaldehyde. Polyacetals suitable for the invention may also be prepared by the polymerization of cyclic acetals.

The polycarbonates with hydroxyl groups used may be of the known kind, e.g. those which may be prepared by reacting diols, e.g. propane-1,3-diol, butane-1,4-diol and/or hexane-1,6-diol or diethyleneglycol, triethylene glycol or tetraethylene glycol, with diarylcarbonates, e.g. diphenylcarbonate or phosgene.

The polyester amides and polyamides include, e.g. the predominantly linear condensates obtained from polyvalent saturated and unsaturated carboxylic acids or their anhydrides and polyvalent saturated and unsaturated amino alcohols, diamines, polyamines and mixtures thereof.

Polyhydroxyl compounds which already contain urethane or urea groups, modified or unmodified natural polyols, e.g. castor oil, carbohydrates and starches, may also be used. Addition products of alkylene oxides with phenolformaldehyde resins or with urea-formaldehyde resins are also suitable for the purpose of the invention.

Examples of these compounds which are to be used according to the invention have been described e.g. in High Polymers, Vol. XVI, "Polyurethanes, Chemistry and Technology", published by Saunders-Frisch, Interscience Publishers, New York, London, Volume I, 1962, pages 32 to 42 and pages 44 to 54 and Volume II, 1964, pages 5 to 6 and 198 to 199 and in Kunststoff-Handbuch, Volume VII, Vieweg-Höchtlen, Carl-Hanser-Verlag, Munich, 1966, e.g. on pages 45 to 71.

If the polyisocyanate or the prepolymer which contains NCO groups has a viscosity above 2000 cP at 25°C, it may be advantageous to reduce the viscosity thereof by mixing it with:
1. the organic amphiphilous compound to be used according to the invention;
2. a low viscosity organic polyisocyanate; and/or
3. an inert blowing agent or solvent.

Component (b)

By "aqueous solutions of alkali metal silicates" are meant the solutions of sodium and/or potassium silicate in water which are normally known as "water glass". Crude commerical solutions which may in addition contain other substances, e.g. calcium silicate, magnesium silicate, borates or aluminates, may also be used. The molar ratio of $Me_2O/SiO_2$ (Me = metal) is not critical and may vary within the usual limits but is preferably between 4 to 1 and 0.2 to 1. If the water content of the plastics first obtained by the reaction with organic components is of minor importance, either because it has no disturbing effect or because it may easily be removed by drying, then neutral sodium silicates may well be used, which may be prepared from 25% to 35%, by weight, solutions. It is preferred, however, to use from 20% to 54%, by weight silicate solutions and these cannot be obtained at a viscosity below 500 poises which is necessary for trouble-free working unless they are sufficiently alkaline. Ammonium silicate solutions may also be used but they are less advantageous. The solutions may be true solutions or colloidal solutions.

The choice of concentration depends mainly on the desired end-product. Compact materials or materials with closed cells are preferably prepared with concentrated silicate solutions which may, if necessary, be adjusted to a low viscosity by the addition of alkali metal hydroxide. Solutions with concentrations of from 40% to 70%, by weight, may be prepared in this way. On the other hand, for producing open-celled, lightweight foams it is preferred to use silicate solutions with concentrations of from 20% to 54%, by weight, in order to obtain low viscosities, sufficiently long reaction times and low unit weights. When finely divided inorganic fillers are used in substantial quantities, it is also preferred to use silicate solutions with concentrations of from 20% to 54%.

Component (c)

According to the invention component (c) consists of organic amphiphilous compounds containing from 1 to 9 carbon atoms and having a molecular weight of from 32 to about 400, preferably from 32 to 150, which contain one OH group and/or at least one other hydrophilic and/or polar group. This other hydrophilic and/or polar group is preferably a functional group corresponding to one of following general formulae; —SH, —CH$_2$Cl, —CH$_2$—Cl, —CH$_2$Br, —CH$_2$I, —CN, —NO$_2$, —COCl, —COBr, —SO$_2$Cl, —COOH, —SO$_3$H, —COO$^-$, —SO$_3^-$, —OR,

wherein R denotes a methyl or ethyl group.

Component (c) may contain an OH group and/or from 1 to 6, preferably 1 or 2 of these other groups.

The following are examples of component (c):

1. Alcohols, thioalcohols, phenols and thiophenols:

methanol, ethanol, propanol, isopropanol, butanol, isobutanol, t-butyl alcohol and the isomeric pentanols, hexanols and heptanols, cyclohexanol, methylcyclohexanol, benzyl alcohol, cyclohexano-methanol, methallylalcohol, butylmercaptan, phenols, e.g. phenol and the cresols, thiophenols and thiocresols. Alcohols with from 1 to 4 carbon atoms are preferred, particularly methanol.

2. Halomethyl compounds:

ethyl chloride, ethyl bromide, ethyl iodide, n-propyl chloride, n-propylbromide, n-propyliodide, isopropyl chloride, isopropyl bromide, isopropyl iodide, butyl chloride, butyl bromide, butyl iodide, $C_3$–$C_6$-halogenated methyl compounds, benzyl halides, e.g. benzyl chloride or benzyl bromide, hexahydrobenzylhalides, e.g. cyclohexanomethyl chloride, epichlorohydrin, 2-ethyl-2-chloromethyl-oxetane and 2-ethyl-2-chloro-methyloxetane.

Halogenated methyl compounds which contain from 4 to 7 carbon atoms are particularly preferred.

3. Nitriles:

acetonitrile, propionitrile, butyronitrile, benzonitrile, tolunitrile, hexahydrobenzonitrile, acrylonitrile, allylnitrile, methallylnitrile, methacrylonitrile.

4. Esters:

methyl acetate, ethyl acetate, propyl acetate, butyl acetate, amyl acetate, the methyl and ethyl esters of propionic, butyric, pentanoic, hexanoic and heptanoic acid and the corresponding isomeric compounds, for example isobutyric acid, and 2,4,6-tribromophenylacetate.

5. Ethers and Thioethers:

methyl ethyl ether, cyclohexyl methyl ether, methyl butyl ether, phenol methyl ether, thiophenol methyl ether, cresol methyl ether, tetrahydrofuranomethylmethyl ether.

6. Ketones:

methyl ethyl ketone, methyl-isopropyl ketone, methyl-isobutyl ketone, methyl-isoamyl ketone, methyl-n-propyl ketone, methyl-n-butyl ketone, methyl-t-butyl ketone, methyl-furanyl ketone, methyl-tetrahydrofuranyl ketone, methyl-heptyl ketone, ethylhexyl ketone, acetophenone, ω-chloroacetophenone and propiophenone.

7. Nitro compounds: nitromethane, nitroethane, nitrohexane, nitrobenzene, chlorinated nitrobenzenes, nitrocyclohexane, brominated nitrobenzenes, benzyl nitrate and nitrotoluene.

8. Carboxylic acid chlorides, carboxylic acid bromides, sulphonic acid chlorides:

acetyl chloride, propionic acid chloride, acetyl bromide, acid chlorides of $C_4$–$C_6$ carboxylic acids, but also methanesulphonic acid chloride, benzenesulphonic acid chloride, p-toluenesulphochloride, o-toluenesulphochloride, carbamic acid chlorides, e.g. t-butyl carbamic chloride, and phenylcarbamic chloride.

9. Carboxylic acids:

formic acid, acetic acid propionic acid, butyric acid, isobutyric acid, pentanoic acid, hexane carboxylic acid, heptane carboxylic acid, cyclohexane carboxylic acid, benzoic acid, toluic acid.

10. Sulphonic acids:

methanesulphonic acid, ethanesulphonic acid, butanesulphonic acid benzenesulphonic acid, 2-toluenesulphonic acid, 4-toluenesulphonic acid, chlorosulphonic acid esters and sulphonic acid esters e.g. methanesulphonic acid methyl ester, methane sulphonic acid ethyl ester and chlorosulphonic acid methyl ester.

The carboxylic acids and/or sulphonic acids may be partially or completely neutralized, for example with alkali metal and alkaline earth metal hydroxides, e.g. sodium hydroxide, potassium hydroxide, barium hydroxide, or magnesium hydroxide, or by the addition of amines, e.g. trimethylamine, triethylamine, methylmorpholine, pyridine, dimethylaniline, or metal alcoholates e.g. sodium t-butanolate, or potassium isopropanolate. Metal oxides, hydroxides or carbonates, either in the solid form or suspended in diluents, may also be used for neutralization. Calcium oxide, magnesium oxide, calcium carbonate, magnesium carbonate and dolomite, for example, are particularly suitable.

Non-volatile higher molecular weight tertiary amines are also particularly useful in this neutralization because they do not evaporate in the subsequent reaction with the alkali metal silicate solution. Amines of this type are, in particular, the alkoxylation products of primary or secondary amines, and also polyesters or polyacrylates which contain tertiary nitrogen atoms as well as the known condensation products based on epichlorohydrin and polyamines of the kind used, for example, for wet strengthening paper. Polycondensation products of weakly basic or sterically hindered amines are preferred because an excessively high increase in viscosity may otherwise occur when using polyamines.

11. Aldehydes:

formaldehyde, acetaldehyde, propionaldehyde, butyl aldehyde, pentanals, hexanals, heptanals, octanals and their simple substitution products, semi-acetals and full acetals.

12. Components (c) according to this invention may also comprise compounds which contain phosphorus, for example trimethyl phosphite, trimethylphosphate, triethylphosphite, triethyl phosphate, diethylphosphite, diethylphosphate, dimethylphosphite, dimethylphosphate, thiophosphoric acid-O,O-dimethyl ester, thiophosphoric acid trimethylester, or thiophosphoric acid-O,O-dimethyl ester chloride.

The preparation of the inorganic-organic plastics according to this invention is simple to carry out. Basically, all that is necessary is to mix the three starting components homogeneously. The mixture then, in most cases, hardens at once. The mixtures are typical finely divided emulsions or sols. They are not optically clear but usually opaque or milky-white. The subsequent xerosol appears to be preformed in them.

Two of the three components (a), (b) and (c) may be premixed, optionally with heating, or all three components may be mixed together, optionally with heating.

Component (c) is preferably premixed with component (a). Alcohols, phenols, carboxylic acids and sulphonic acids are preferably added to a mixture of all the other components or premixed with component (b).

The mixture of the three components is not stable. The so-called "pot life" during which the mixtures are in a workable state depends mainly on the chemical nature of the organic components of the system, the total quantity of liberated silicate hardener and the concentration of the silicate solution. It varies from 0.2 seconds to 10 hours.

Accordingly, mixing is generally carried out immediately before the shaping process.

It is surprising that the reaction between the polyisocyanates and the alkali metal silicate solution proceeds practically to completion within a few seconds in the presence of the organic amphiphilous compounds to be used according to the invention. It is also surprising that no bubble formation occurs in the absence of volatile compounds. This means that within a short reaction time all the carbon dioxide evolved by the reaction of the NCO groups with the water diffuses through the interface into the aqueous phase and hence the exceptionally large size of the phase interface area which is a main feature of the process according to the invention and contributes to the surprising overall combination of properties.

Production of the novel composite materials of polymer and silicic acid gel may be carried out by technological methods which are already known in principle for example the methods employed for producing cast or foamed polyurethanes. However, since pot lives are usually short and the reaction often takes place spontaneously, the possibilities of employing discontinuous methods of production are usually limited. They are virtually confined to the production of smaller molded products weighing not more than 100 kg. The components are preferably mixed continuously by the conventional process for producing polyurethane foams, using a mixing chamber with short residence times, and then hardened under shaping conditions. This may be carried out, for example, by pouring the liquid or pasty mixture into molds or applying it to surfaces or using it to fill e.g. recesses, joints and gaps.

When mixing the components, the proportion, by weight of the sum of organic constituents and alkali metal silicates may vary within wide limits, e.g. from 99:1 to 1:99. Preferably, the proportion of total organic constituent to silicate constituent is from 98:2 to 5:95. Optimum use properties, in particular, high strength, elasticity, dimensional stability to heat and flame resistance, are obtained by mixing the polyisocyanate content with the silicate content in proportions of from 70:30 to 20:80. The quantity of component (c) used is from 1% to 30%, by weight preferably from 2% to 20%, by weight, based on polyisocyanate component (a).

This range is therefore particularly preferred.

From the proportions indicated above it is clear that the quantitative proportions used for producing this polymer/silicic acid gel composite material are not critical. This is particularly advantageous because it is then not necessary to keep to exact measurements in the continuous methods of production using feed apparatus and mixing chambers. It is therefore possible to employ sturdy feed devices such as gear wheel pumps.

The activity of the reaction mixture may be adjusted mainly by the polyisocyanate content and by the nature and quantity of component (c) used according to the invention. The reactivity increases in proportion to the quantity of NCO groups. In addition, it increases with the activity of the additives, which contain a maximum of 7 carbon atoms, and with the quantity of additives used according to the invention.

Products with a low silicate content, e.g. from 1% to 30%, are preferably prepared in cases where the organic polymer properties are the most important and the silicate content is required, for example, to achieve better binding of the fillers, in particular fillers of the so-called "inactive" type, e.g. chalk, heavy spar, gypsum, anhydrite, clay or kaolin.

The use of only small quantities of silicate solutions is also indicated where a polyisocyanate is required to be hardened with water to form a non-cellular, homogeneous material. Since, as is known, the reaction of NCO groups with water is accompanied by evolution of $CO_2$, it may in practice only be used for producing foams. Even when water glass solutions are used in conventional elastomer formulations, the formation of pores by the $CO_2$ evolved cannot be avoided. On the other hand, the reaction of the three starting component results in a product with a considerably reduced pore formation and, if the proportions of the components are accurately adjusted to each other, which may easily be achieved by empirical tests, a material completely free from bubbles which has, so-to-speak, been chain lengthened or cross-linked with water, is obtained. In this way, high grade homogeneous polyureas become available by a simple and direct solvent-free process. The desired reaction velocity may easily be adjusted by varying the proportions of (a) to (b) to (c).

A high silicate content, e.g. from 80% to 99%, by weight is desirable if the final product is required to have mainly the properties of an inorganic silicate plastic, in particular high temperature resistance and complete flame resistance. In that case, the function of the polyisocyanate is that of a non-volatile hardener whose reaction product is a high molecular weight polymer which reduces the brittleness of the product. Due to the elasticizing effect, these polyisocyanates are superior to the conventional acidic hardeners. The hardening times generally increase with decreasing proportion of component (c), although the process may, of course, be carried out in combination with known acid splitting hardeners.

Mixtures which contain more than 30% of water are preferably used for producing thin layers, for example surface coatings, putties, adhesive bonds or grouting compositions and, in particular, for producing foams.

When producing foams by the process according to the invention, it is advisable to add blowing agents. These are inert liquids with boiling points ranging from −25° to 80°C and preferably from −15° to 40°C. The blowing agents are preferably insoluble in the silicate solution. They are used in quantitites of from 0 to 50%, by weight, preferably from 2 to 30%, by weight based on the reaction mixture.

The organic blowing agents used may be, e.g. acetone, ethyl acetate, methanol, ethanol halogenated alkanes, e.g. methylene chloride, chloroform, ethylidene chloride, vinylidene chloride, monofluorotrichloromethane, chlorodifluoromethane, dichlorodifluoromethane, butane, hexane, heptane or diethylether. Compounds which decompose at temperatures above room temperature with liberation of gases, e.g. nitrogen, such as azo compounds, azoisobutyric acid nitrile, may also act as blowing agents. Other examples of blowing agents and details about the use of blowing agents are described in Kunststoff-Handbuch, Volume VII, published by Vieweg and Hochtlen, Carl-Hanser-Verlag, Munich 1966, e.g. on pages 108 and 109, 453 to 455 and 507 to 510.

Catalysts are also often used in the process according to the invention. They may be known catalysts, e.g. tertiary amines, e.g. triethylamine, tributylamine, N-methyl-morpholine, N-ethyl-morpholine, N-coco-morpholine, N,N,N',N'-tetramethylethylenediamine, 1,4-diaza-bicyclo-(2,2,2)-octane, N-methyl-N'-dimethylaminoethyl piperazine, N,N-dimethylbenzylamine, bis-(N,N-diethylaminoethyl)-adipate, N,N-diethylbenzylamine, pentamethyldiethylene triamine, N,N-dimethylcyclohexylamine, N,N,N',N'-tetramethyl-1,3-butanediamine, N,N-dimethyl-β-phenylethylamine, 1,2-dimethylimidazole and 2-methylimidazole.

Suitable tertiary amine catalysts which contain hydrogen atoms which are reactive with isocyanate groups include, e.g. triethanolamine, triisopropanolamine, N-methyl-diethanolamine, N-ethyl-diethanolamine, N,N-dimethyl-ethanolamine and their reaction products with alkylene oxides, e.g. propylene oxide and/or ethylene oxide.

Silaamines with carbon-silicon bonds as described e.g. in British Pat. No. 1,090,589, may also be used as catalysts, e.g. 2,2,4-trimethyl-2-silamorpholine or 1,3-diethylaminomethyl-tetramethyl-disiloxane.

Bases which contain nitrogen, e.g. tetraalkylammonium hydroxides, alkali metal hydroxides, e.g. sodium hydroxide, alkali metal phenolates, e.g. sodium phenolate, and alkali metal alcoholates, e.g. sodium methylate, may also be used as catalysts. Hexahydrotriazines are also suitable catalysts.

Organo — metallic compounds may be used as catalysts according to the invention, in particular organo — tin compounds.

The organo — tin compounds are preferably tin (II) salts of carboxylic acids, e.g. tin (II) acetate, tin (II) octoate, tin (II) ethyl hexoate and tin (II) laurate and the dialkyl tin salts of carboxylic acids, e.g. dibutyl tin diacetate, dibutyl tin dilaurate, dibutyl tin maleate or dioctyl tin diacetate.

Other examples of catalysts which may be used according to the invention and details of their action are described in Kunststoff-Handbuch, Volume VII, published by Vieweg and Hochtlen, Carl-Hanser-Verlag, Munich, 1966, e.g. on pages 96 and 102.

The catalysts are generally used in a quantity of from 0.001% to 10% by weight, based on component (a).

Surface active additives, (emulsifiers and foam stabilizers), may also be used according to the invention. Suitable emulsifiers are, e.g. the sodium salts of ricinoleic sulphonates or of fatty acids, or salts of fatty acids with amines, e.g. oleic acid diethylamine or stearic acid diethanolamine. Alkali metal or ammonium salts of sulphonic acids, e.g. dodecylbenzene sulphonic acid or dinaphthyl methane disulphonic acid, or of fatty acids, e.g. ricinoleic acid, or of polymeric fatty acids, may also be included as surface active additives.

The foam stabilizers used are mainly water-soluble polyether siloxanes. These compounds generally have a polydimethylsiloxane group attached to a copolymer of ethylene oxide and propylene oxide. Foam stabilizers of this kind have been described e.g. in U.S. Pat. No. 3,629,308. These additives are preferably used in quantities of from 0% to 20%, by weight, based on the reaction mixture.

Negative catalysts, for example substances which are acidic in reaction, e.g. hydrochloric acid or organic acid halides, known cell regulators, e.g. paraffins, fatty alcohols or dimethyl polysiloxanes, pigments or dyes, known flame retarding agents, e.g. tris-chlorethylphosphate or ammonium phosphate and polyphosphate, stabilizers against aging and weathering, plasticizers, fungicidal and bacteriocidal substances and fillers, e.g. barium sulphate, kieselguhr, carbon black or whiting, may also be used according to the invention.

Further examples of surface active additives, foam stabilizers, cell regulators, negative catalysts, stabilizers, flame retarding substances, plasticizers, dyes, fillers and fungicidal and bacteriocidal substances and details about methods of using these additives and their action may be found in Kunststoff-Handbuch, Volume VI, published by Vieweg and Hochtlen, Carl-Hanser-Verlag, Munich 1966, e.g. on pages 103 to 113.

Particularly important and preferred are those additives which result in an even greater improvement in the fire characteristics of the product. These include not only the conventional flame retarding agents but also, in particular, halogenated paraffins and inorganic salts of phosphoric acid.

Basically, the production of the foam plastics according to the invention is carried out by mixing the above described reactants in one or more stages in a continuously or intermittently operating mixing apparatus and then allowing the resulting mixture to foam and solidify, usually outside the mixing apparatus in molds or on suitable supports. The reaction temperature required for this, which may be from 0° to 200°C and is preferably from 30° to 160°C, may either be achieved by heating one or more of the reactants before the mixing process or by heating the mixing apparatus itself or, alternatively, by heating the reaction mixture after the components have been mixed. Combinations of these or other methods of adjusting the reaction temperature may, of course, also be employed. In most cases, sufficient heat is evolved during the reaction to enable the reaction temperature to rise to values above 50°C after the reaction or foaming has begun.

If desired, however, the reactants may also be reacted together by the conventional one-step process, prepolymer process or semi-prepolymer process, which processes are often carried out with the aid of mechanical devices such as those described in U.S. Pat. No. 2,764,565. Processing apparatus which may be used in the process according to the invention have been described in Kunststoff-Handbuch, Volume VII, published by Vieweg and Hochtlen, Carl-Hanser-Verlag, Munich, 1966, e.g. on pages 121 to 205.

Particularly high quality plastics are obtained by the present process according to the invention if hardening is carried out at temperatures above 20°C, in particular from 50° to 200°C. In particular, if combinations of prepolymers which contain from 10% to 40% of NCO groups and alkali metal silicate solutions are used, so much heat is liberated that even without external heat supply, the water contained in the reaction mixture starts to evaporate. Temperatures above 150°C are easily reached in the interior of foam blocks.

It appears that a particularly vigorous interaction takes place between the inorganic and organic phases under these conditions and a particularly intimate bond is formed between them so that the resulting materials are not only rock hard but also highly elastic and therefore exceptionally resistant to shock and breakage.

If the heat evolved by the reaction between the components is not enough, mixing may easily be carried out at higher temperatures, e.g. at from 40° to 100°C, and in some cases it may even be carried out above 100°C, up to approximately 150°C, under pressure, so that when the material is discharged it foams as the pressure is released.

When foaming is carried out at higher temperatures it is, of course, possible also to use higher boiling blowing agents, e.g. hexane, dichloroethane, trichloroethane, carbon tetrachloride or light petrol, but the water contained in the mixture may also take over the function of blowing agent. Fine metal powders, e.g. powdered calcium, magnesium aluminum or zinc, may also act as blowing agents by bringing about the evolution of hydrogen if the water glass is sufficiently alkaline. At the same time, these metal powders have a hardening and reinforcing effect.

The foams may also be produced with the aid of inert gases, particularly air, for example, one of the two reactants may first be foamed with air and then added to the other reactants. Compressed air, for example, may also be used for mixing the components. This leads directly to the formation of a foam which is then hardened and shaped simultaneously.

The properties of the foams obtained from any given formulation, e.g. their density in the moist state, depends to some extent on the details of the mixing process, e.g. the form and speed of the stirrer and the form of the mixing chamber, and also the selected temperature at which foaming is started. This density may vary from 0.005 to 1.2 g/cm$^3$ and in most cases a moist, fresh foam has a density of from 0.02 to 0.8 g/cm$^3$. The dried foams may have closed or open cells; in most cases they are to a large extent open-celled and have densities of from 0.01 to 0.6 g/cm$^3$.

The characteristics of the reaction mixtures provide many possible uses and wide fields of application for the process according to the invention, some of which will be outlined below by way of example. The possibility exists of retaining the water in the hardened mixtures as a desirable constituent of the foam, or even if desired, of protecting the foam against loss of water by coating or laminating it, or alternatively, of partially or completely removing the water by suitable drying processes, e.g. in a drying cabinet or by the application of hot air, IR, ultrasound or high frequency (HF), these methods may be adapted to the desired technical purpose in each case.

The reaction mixture containing blowing agent may, for example, be spread coated on suitable hot or cold supports or supports exposed to IR or HF radiation, or, after passing through the mixing apparatus, the reaction mixture may be sprayed on these supports by means of compressed air or by the airless spraying process. Subsequently, the mixture foams up and hardens on the supports to form a filling or insulating or moisture proofing-coating. The foaming reaction mixture may also be forced, poured or injection molded into cold or heated molds, which may be relief molds or solid or hollow molds, optionally by centrifugal casting, and left to harden at room temperature or temperatures up to 200°C, optionally under pressure. Reinforcing elements may quite easily be incorporated into these reaction mixtures. These inorganic and/or organic reinforcing elements may be, e.g. metal wires, fibers, fleeces, foams, fabrics or skeletons. Incorporation of these reinforcing elements may be achieved, for example, by the fibrous web impregnation process or by processes in which the reaction mixtures and reinforcing fibers are together applied to the mold, for example, by means of a spray apparatus. The shaped products obtainable in this way may be used as building elements, e.g. in the form of sandwich elements either as such or after they have been laminated with, e.g. metal, glass or plastics, if desired, these sandwich elements may be foamed. When used for this purpose, the advantageous fire characteristics of the products in the moist or dry state is an advantage. Alternatively, the products may be used as hollow bodies, e.g. as containers for goods which may be required to be kept moist or cool, as filter materials or exchangers, as catalyst carriers or carriers of other active substances, as decorative elements, furniture components and fillings for cavities. They may also be used as heavy duty lubricants and coolants or as carriers for such substances, e.g. in metal extrusion presses. Their use in the field of model building and mold building and the production of molds for metal casting may also be considered.

According to a preferred procedure, the foaming process is made to take place simultaneously with the hardening process by preparing the reaction mixture, e.g. in a mixing chamber and at the same time adding a readily volatile blowing agent, e.g. dichlorodifluoromethane, trichlorofluoromethane, butane, isobutylene or vinyl chloride, so that, with suitable choice of the mixing temperature, the reaction mixture leaving the mixing chamber foams due to evaporation of the blowing agent and at the same time hardens due to the action of the hardener, and the resulting foam, which may still contain emulsifiers, foam stabilizers and other additives, is fixed. Furthermore, the reaction mixture which initially is still liquid may be blown up into a foam by introducing gases, e.g. air, methane, $CF_4$ or inert gases. optionally under pressure, and then introducing this foam into the desired mold where it is left to harden. If desired, the silicate or non-ionic hydrophilic prepolymer solution optionally containing foam stabilizers, wetting agents, foam-forming agents, emulsifiers and possibly other organic or inorganic fillers or diluents may be converted into a foam by the introduction of gas and this foam may then be mixed with the counter component and optionally the hardener in a mixing apparatus and left to harden.

According to a particularly preferred method of carrying out the process, a preliminary mixture of polyisocyanates and component (c) is first prepared to which a blowing agent may be added and this preliminary mixture is then vigorously mixed with the silicate component (b), optionally containing activator or emulsifier, and the whole mixture then foams and hardens simultaneously.

Instead of blowing agents, finely divided inorganic or organic hollow particles, e.g. hollow expanded beads of glass or plastics and straw, may be used for producing the foams.

The products obtainable in this way may be used in the dry or moist state, optionally after a compression or tempering process, optionally under pressure, as insulating materials, cavity fillings, packaging materials, building materials which have good solvent resistance and advantageous fire characteristics. They may also be used as lightweight building bricks in the form of sandwiches, e.g. with metal covering layers, for house building and the construction of motor vehicles and aircraft.

The reaction mixtures may also be foamed and then hardened in the form of droplets, e.g. dispersed in petroleum hydrocarbons or during free fall, foam beads being obtained in this way.

Provided that the foaming reaction mixtures remain fluid, organic and/or inorganic particles which are capable of foaming up or have already been foamed may be incorporated, e.g. expanded clay, expanded glass, wood, popcorn, cork, hollow plastics beads e.g. beads of vinyl chloride polymers, polyethylene, styrene polymers or foam particles of these polymers or of other polymers e.g. polysulphone, polyepoxide, polyurethane urea-formaldehyde, phenol-formaldehyde or polyimide polymers, or, alternatively, heaps of these particles may be permeated with foaming reaction mixtures to produce insulating materials which have good fire characteristics.

If a blowing agent which is capable of evaporating or liberating a gas at a given temperature, for example a hydrocarbon or a halogenated hydrocarbon, is added at this temperature to a mixture of aqueous silicate solutions and hardeners, optionally also containing inorganic and organic constituents, then the resulting mixture, which is initially liquid, may be used not only for producing homogeneous foams or foams which contain foamed or unfoamed fillers but it may also be used for permeating fleeces, fabrics, meshes, constructional parts or other permeable structures of foamed materials with foam so that composite foams are obtained which have special properties, e.g. good fire characteristics. These composite foams may be used directly as constructional elements in the building industry, furniture industry or motor vehicle and aircraft industry.

The foams according to the invention may be added to the soil in a crumbly form, optionally mixed with fertilizers and plant protective agents, to improve the agricultural consistency. Foams which have a high water content may be used as substrates for the propagation of seedlings, cuttings and plants or cut flowers. By spraying the mixtures on terrain which is impassable or too loose, e.g. dunes or marshes, the ground may be solidified so that it becomes passable within a short time and is protected against erosion.

In cases of fire, the reaction mixtures may also be sprayed on to any object which is required to be protected. The water contained in the mixture is unable to run down the surface of the object which it is protecting and cannot evaporate quickly and consequently the object is provided with a very effective protection against fire, heat or radiation because, so long as the hardened mixture still contains water it cannot be heated to temperatures much above 100°C and it absorbs IR or nuclear radiation.

Since these mixtures may easily be sprayed, they may form effective protective walls and protective layers in mines in the case of accident as well as in routine work, for example by spraying them on fabrics, other surfaces, wire meshes or even only on walls. One characteristic of the mixtures which is particularly important for this purpose is that they harden very quickly.

The foaming mixtures may also be used, e.g. in underground and surface engineering and road building, for the erection of walls and igloos, for sealing joints, for sealing and plastering surfaces, for priming, insulating and decorating and as coating, flooring compositions and as lining material. They may also be used as adhesives, mortars or casting compositions, with or without inorganic or organic fillers.

Since the hardened foams produced according to the invention are very porous after drying, they are suitable for use as drying agents because they are then able to reabsorb water. Alternatively, they may be charged with active substances or used as catalyst carriers, filters or absorbents.

The properties of the foams in the aqueous or dry state may be modified as desired by means of auxiliary agents which may be incorporated in the reaction mixture or introduced subsequently, e.g. emulsifiers, detergent raw materials, dispersing agents, wetting agents, aromatic substances or substances which render the product hydrophobic.

The foams, in the aqueous or dry or impregnated state, may subsequently be lacquered, metallized, coated, laminated, galvanized, vapor treated, bonded or blocked. The shaped products may undergo further shaping processes, both in the aqueous and dry state, for example by sawing, cutting, drilling, planing, polishing or other working processes.

The shaped products, with or without filler, may be further modified in their properties by subsequent heat treatment, oxidation processes, hot pressing, sintering processes or surface melting or other compacting processes.

The molds are suitably made of inorganic and/or organic foamed or unfoamed materials such as metals, e.g. iron, nickel, refined steel or lacquered or e.g. "Teflonized" aluminum, or porcelain, glass, gypsum, cement, wood or plastics, e.g. polyvinyl chloride, polyethylene, epoxide resins, polyurethanes, ABS or polycarbonate.

The foams of the present invention may be dried on the surface or, if they are permeable structures, for example higher grade open-celled foams or porous materials, they may also be dried by, e.g. centrifuging, vacuum treatment, by blowing air through them, or rinsing them with (optionally heated) liquids or gases which remove the water contained in them, for example methanol, ethanol, acetone dioxane, benzene, chloroform or air, $CO_2$ or steam. Similarly, the moist or dried shaped products may also be after-treated by rinsing them or impregnating them with aqueous or non-aqueous acidic, neutral or basic liquids or gases, e.g. hydrochloric acid, phosphoric acid, formic acid, acetic acid, ammonia amines, organic or inorganic salt solutions, lacquer solutions, solutions of polymerized monomers or monomers which are still to be polymerized, dye solutions, galvanizing baths, solutions of catalysts or catalyst precursors or perfumes.

The novel composite plastics are also suitable for use as constructional materials since they are resistant to tension and compression and are tough and stiff and yet still elastic and have a high dimensional stability to heat and high flame resistance. The excellent heat insulating and sound absorption capacity of these foams should also be mentioned which, together with their excellent fire resistance and heat resistance, provides applications in the field of insulation.

Thus, for example high quality lightweight building panels may be produced by cutting or sawing continuously foamed blocks into panels or by foaming such panels, or more complicated shapes, in molds, optionally under pressure. Shaped elements of this kind with a compact outer skin may also be produced by suitable methods.

In particular, however, the process according to the invention is suitable for in situ foaming on the building site. Any hollow forms obtained by means of shutterings in the conventional way may be filled up and used for foaming in this way.

The reaction mixtures may also be used for filling cavities, joints and cracks, in which case they form a very firm bond between the materials which are to be joined. Insulating internal plasters may also be produced simply by spraying the reaction mixtures.

In many cases, the materials obtained may be used in place of wood or hard fiber boards. They may be sawed, ground, planed, nailed, drilled and cut and may therefore be treated and used in many different ways.

Very brittle lightweight foams which may be obtained, for example, with reaction mixtures which have a very high silicate content, or by using a combination containing brittle organopolymers, may easily be obtained in the form of dustfine powders by crushing them in suitable apparatus. These powders may be used for many different purposes as organo-modified silicic acid fillers. The organo-modification results in a good surface interaction with polymers and, in many cases, also provides a certain surface thermoplasticity which enables high quality molding materials to be produced from them, and the addition of cross-linking agents enables topochemical surface reactions to be carried out.

In many applications, fillers in the form of particles or powders are added to the mixtures of components (a), (b) and (c).

The fillers used may be, e.g. in the form of powders, granulates, wire, fibers, dumb-bell shaped particles, crystallites, spirals, rods, beads, hollow beads, foam particles, non-woven webs, pieces of woven or knitted fabrics, tapes and pieces of foil, of solid inorganic or organic substances, e.g. dolomite, chalk, alumina, asbestos, basic silicic acids, sand, talc, iron oxide, aluminum oxide and hydroxides, alkali metal silicates, zeolites, mixed silicates, calcium silicates, calcium sulphates, alumino silicates, cements, basalt wool or powder, glass fibers, carbon fibers, graphite, carbon black, Al, Fe, Cu and Ag powders, molybdenum sulphide, steel wool, bronze or copper meshes, silicon powder, expanded clay particles, hollow glass beads, glass powder, lava and pumice particles, wood chips, woodmeal, cork, cotton, straw, popcorn, coke or particles of filled or unfilled, foamed or unfoamed, stretched or unstretched organic polymers. Among the numerous organic polymers which may be used e.g. as powders, granulates, foam particles, beads, hollow beads, foamable but not yet foamed particles, fibers, tapes, woven fabrics, or fleeces, the following may be mentioned as examples: polystyrene, polyethylene, polypropylene, polyacrylonitrile, polybutadiene, polyisoprene, polytetrafluoroethylene, aliphatic and aromatic polyesters, malamine-urea or phenol resins, polyacetal resins, polyepoxides, polyhydantoins, polyureas, polyethers, polyurethanes, polyimides, polyamides, polysulphones, polycarbonates and, of course, any copolymers thereof.

In principle, the composite materials according to the invention may be mixed with considerable quantities of fillers without losing their advantageous properties, and in particular composite materials which consist predominantly of inorganic constituents are preferably filled with inorganic fillers to obtain a reinforcing effect while composite materials in which the silicate constituent predominates are preferably filled with organic fillers.

Fillers which are particularly preferred are chalk, talc, dolomite, gypsum, clay, anhydrite, glass, carbon and the conventional plastics and rubber waste.

Products with a low silicate content are particularly suitable for producing rapidly hardening high quality surface coatings which have excellent adherance and wear resistance and for producing elastomers with high strength and high modulus of elasticity.

For producing surface coatings, bonds, putties or interlayers, particularly in the case of porous materials, it is often not necessary to incorporate a hardener because the carbon dioxide in the atmosphere is sufficient to act as hardener.

For such purposes it is preferred to use polyisocyanates which have only a low isocyanate content, e.g. less than 5%, or prepolymers which are free from isocyanate groups. The mixtures obtained in this way have a long pot life and may be applied in thin layers and gradually harden in the course of time.

If only a small quantity of hardener, (e.g. $CO_2$), is liberated during the process of mixing component (c) and the silicate solution, a pasty or dough-like material with a plastic texture is obtained by partial hardening accompanied by an increase in viscosity. This material may be converted into any shape and hardened at a later date, e.g. by drying in air or by heating.

A two-stage or multistage hardening in which, for example, rapid evolution of $CO_2$ takes place in the first stage, (e.g. by the reaction of NCO groups with water), to convert the inorganic-organic composite material into a plastic or thermoplastic, workable form, whereupon hardening takes place in a second, slower hardening stage, e.g. by hydrolysis of a high molecular weight or low molecular weight ester, is particularly interesting if the compositions are to be worked-up as putties, compositions which may be spread coated with a trowel, grouting compositions or mortar.

The thermoplastic intermediate stage may also be injection molded, extruded or worked-up in a kneader.

In many cases, these intermediate stages may be mixed with water, organic solvents, plasticizers, extenders or fillers so that they may be modified for various applications.

The materials provided by the invention are also suitable for use as impregnating agents for finishing fibers. The fibers may be treated with the finished mixtures of organic and silicate component or they may be impregnated by a two-bath treatment. The component which adheres more firmly is preferably applied first, i.e. the polyisocyanate component on organic material and the silicate component on inorganic material.

The mixtures may also be converted into fibers and foils by extruding them through dies or slots, and these fibers or foils may be used e.g. for producing synthetic incombustible paper or fleeces.

The percentages given in the following examples are percentages by weight unless otherwise indicated.

POLYISOCYANATE USED (COMPONENT (A)) IN THE FOLLOWING EXAMPLES:

Polyisocyanate I

Diisocyanatodiphenylmethane is distilled from the crude phosgenation product of an aniline-formaldehyde condensate until the distillation residue has a viscosity of 100 cP at 25°C, (dinuclear content: 59.7%, by weight, trinuclear content: 21.3% by weight, proportion of higher nuclear polyisocyanates: 19.0%, by weight).

Polyisocyanate II

A polyisocyanate with a viscosity of 200 cP at 25°C prepared as described for polyisocyanate I, (dinuclear content: 45.1%, by weight, trinuclear content: 23.5%, by weight, proportion of higher nuclear polyisocyanates: 32.2%, by weight).

Polyisocyanate III

Polyisocyanate with a viscosity of 400 cP at 25°C prepared as described for polyisocyanate I (dinuclear content: 45.1%, by weight, trinuclear content: 22.3%, by weight, proportion of higher nuclear polyisocyanates: 32.6%, by weight).

Polyisocyanate IV

Polyisocyanate with a viscosity of 500 cP at 25°C prepared as described for polyisocyanate I (dinuclear content: 40.6%, by weight, trinuclear content: 27.2%, by weight, proportion of higher nuclear polyisocyanates: 32.2%, by weight.

Polyisocyanate V

Polyisocyanate with a viscosity of 700 cP at 25°C prepared as described for polyisocyanate I (dinuclear content: 40.3%, by weight, trinuclear content: 34.0%, by weight, proportion of higher nuclear polyisocyanates 25.7%, by weight).

Polyisocyanate VI

20% solution of a distillation residue of the distillation of commercial tolylene diisocyanate in a crude phosgenation product of an aniline-formaldehyde condensate. Viscosity at 25°C: 1260 cP; NCO content: 29.3%, by weight.

METHOD EXAMPLES

Example 1

| Component (a): | 600 g polyisocyanate II |
| --- | --- |
| | 20 g trichlorofluoromethane |
| Component (b): | 600 g sodium water glass (44%, $Na_2O:SiO_2 = 1:2$), |
| | 5 g triethylamine, |
| | 1.5 g of emulsifier (sodium salt of a sulpho-chlorinated $C_{10}$-$C_{14}$ paraffin mixture, "Mersolat K 30") and |
| Component (c) | 2.8 g methanol. |

Component (a) and (b)+(c) were first mixed separately and then vigorously mixed together for 15 seconds with the aid of a high speed stirrer. The reaction mixture was then poured into a paper mold in which it began to foam up after 62 seconds and solidified after a further 16 seconds. A hard, inorganic-organic foam with a medium-coarse cell structure was obtained. After drying, (3 hours at 120°C), it had a unit weight of 214 kg/m$^3$ and a compression strength of 13.2 kg/cm$^2$.

Example 2

The procedure is the same as in Example 1 but the polyisocyanate used was 600 g polyisocyanate III. An inorganic-organic foam with a regular pore structure, a unit weight of 182 kg/m$^3$ and a compression strength of 9.7 kp/cm$^2$ is obtained in a similar manner to Example 1.

Example 3 (Comparison example)

The procedure is similar to that of Example 1, but component (c) used according to the invention (methanol in Example 1) is omitted. Although an inorganic-organic foam is again obtained, it not only has a completely irregular pore structure but also has so many cracks and holes that it is impossible to determine the compression strength.

If a procedure similar to that of Example 2 is used, but without methanol, the foam collapses.

Another experiment showed that amphiphilous methanol in no way acts as additional blowing agent. If methanol is omitted from component (b) in Example 1, and if instead of 20 g trichlorofluoromethane in component (a) (20 + 2.8 = 22.8 g of trichlorofluoromethane) are used, then a completely collapsed foam is obtained.

Examples 4 – 15 are summarized in the Table. The procedure is basically the same as in Example 1. The abbreviation have the following meanings:

$t_R$ = stirring time or mixing time of the two components (a) and (b), $t_L$ = lying time, time from the onset of mixing to the onset of foaming, $t_A$ = setting time, time from the onset of mixing to hardening.

All the quantities are given in parts by weight. The resulting inorganic-organic foams are hard foams with a medium pore size and regular cell structure. The unit weight and compression strength were determined after tempering, (3 hours at 120°C).

No blowing agents were used in Examples 7 – 15. The masses obtained were pourable, hardened very rapidly with heating and were, in most cases, pore-free macroscopically homogeneous inorganic-organic plastics. The masses are rock hard but have a high impact elasticity.

| Example No. | 4 | 5 | 6 | 7 | 8 | 9 | 10 | 11 | 12 | 13 | 14 | 15 |
| --- | --- | --- | --- | --- | --- | --- | --- | --- | --- | --- | --- | --- |

-continued

| | | | | | | | | | | | | |
|---|---|---|---|---|---|---|---|---|---|---|---|---|
| Polyisocyanate III | 150 | 150 | 150 | 150 | 150 | 150 | 150 | 150 | 75 | 100 | | |
| Polyisocyanate II | | | | | | | | | 75 | | 50 | 150 |
| Polyisocyanate I | | | | | | | | | | 50 | | |
| Polyisocyanate V | | | | | | | | | | | 100 | |
| Cement | — | — | — | 100 | 100 | 100 | 100 | 100 | 100 | 100 | 100 | 100 |
| Formulation | | | | | | | | | | | | |
| Methanol | | | | | | | | | 2 | 2 | 2 | 2 |
| Hexan-1-ol | | | | | | | | 10 | | | | |
| n-butyl bromide | — | 9 | — | — | — | — | 9 | — | — | — | — | — |
| 2-chloro-2-methylpropane | — | — | 4.5 | — | — | — | — | — | — | — | — | — |
| $C_6H_5$-COONa | — | — | — | 4.5 | — | — | — | — | — | — | — | — |
| p-toluenesulphonic acid | — | — | — | — | 4.5 | — | — | — | — | — | — | — |
| Benzene sulphonic acid | 6 | — | — | — | — | 1.5 | — | — | — | — | — | — |
| Trichlorofluoromethane | 20 | 20 | 20 | — | — | — | — | — | — | — | — | — |
| 40% Water glass | 150 | 150 | 150 | 150 | 150 | 150 | 150 | 150 | 150 | 150 | 150 | 150 |
| Triethylamine | 1.5 | 1.5 | 1.5 | 0.5 | 0.5 | 0.3 | 0.5 | 0.4 | 0.3 | 0.3 | 0.3 | 0.3 |
| 50% "Mersolat" | 0.1 | 0.2 | 0.2 | 0.2 | 0.2 | 0.2 | 0.2 | 0.2 | 0.2 | 0.2 | 0.2 | 0.2 |
| Reaction times | | | | | | | | | | | | |
| $t_R$ (sec.) | 15 | 38 | 29 | 20 | 20 | 20 | 20 | 20 | 25 | 25 | 25 | 25 |
| $t_L$ (sec.) | 42 | 46 | 36 | 31 | 39 | 51 | 49 | — | — | — | — | — |
| $t_A$ (sec.) | 62 | 54 | 42 | 50 | 70 | 110 | 110 | 93 | 73 | 91 | 82 | 75 |
| Rising height (cm) | 53 | 60 | 63 | — | — | — | — | — | — | — | — | — |
| Assessment | | | | | | | | | | | | |
| Unit weight (kg/m³) | 211 | 159 | 147 | 1389 | 1245 | 1451 | 1425 | 1263 | 1310 | 1291 | 1405 | 1360 |
| Compression strength (kp/cm²) | 12.8 | 12.2 | 12.4 | 687 | 613 | 601 | 551 | 331 | 443 | 413 | 392 | 408 |

Examples 16 – 20

In the following Example, a sulphonated polyisocyanate VII prepared by reacting polyisocyanate III with gaseous sulphur trioxide, (sulphur content 0.95%, by weight, NCO content 29.3%, by weight, viscosity 1800 cP at 25°C), was used in addition to the polyisocyanate III and the component (c) used according to the invention. Example 20 is a comparison experiment.

produced. This foam was therefore produced without additional emulsifier.

A comparison Example was carried out in a similar manner except that the amphiphilous component (c) according to the invention, in this case methanol, was omitted. After a stirring time of 15 seconds ($t_R$), the viscosity was already so high that the reaction mixture could be only partly transferred to the paper packet. After 65 seconds, ($t_L$), the reaction mixture began to

| Example No. | 16 | 17 | 18 | 19 | 20 |
|---|---|---|---|---|---|
| Polyisocyanate III | 125 | 75 | 100 | 75 | 125 |
| Polyisocyanate VII | 25 | 75 | 50 | 75 | 25 |
| 2-Chloro-2-methylpropane | 10 | 6 | — | — | — |
| Hexan-1-ol | — | — | 6 | — | — |
| 1-Bromobutane | — | — | — | 4.5 | — |
| Cement | 100 | 100 | 100 | 100 | 100 |
| Trichlorofluoromethane | 20 | 20 | 20 | 20 | 20 |
| 40% Water glass | 150 | 150 | 150 | 150 | 150 |
| Triethylamine | 1.5 | 1.5 | 1.5 | 1.5 | 1.5 |
| 50% "K39" | 0.2 | 0.2 | 0.2 | 0.2 | 0.2 |
| Rising height (cm) | 52 | 74 | 62 | 65 | 34 |
| $t_R$ (sec.) | 15 | 15 | 15 | 15 | 15 |
| $t_L$ (sec.) | 46 | 29 | 31 | 24 | 28 |
| $t_A$ (sec.) | 56 | 36 | 38 | 31 | 45 |
| Unit weight (kg/m²) | 279 | 188 | 224 | 217 | collapsed, Large cracks |
| Compression Strength (kp/cm²) | 8.9 | 16.1 | 18.4 | 17.5 | |

Example 21

20 g trichlorofluoromethane and 5 g methanol were added to 150 g of a polyisocyanate mixture consisting of 80% polyisocyanate II and 20% polyisocyanate VI, and the components were vigorously mixed for 30 seconds. A mixture of 150 g 44% sodium water glass and 0.5 g triethylamine was added to this mixture and mixed with a high speed stirrer, (15 seconds = $t_R$). The resulting mixture was then poured into a paper packet in which the reaction mixture begins to foam up after 30 seconds, ($t_L$), and solidified after only 42 seconds, ($t_A$), to a hard, inorganic-organic foam with a regular cell structure of medium pore size. The foam had a unit weight of 123 kg/m³ immediately after it had been foam up slightly. A cracked material with completely irregular pores and non-homogeneous zones was obtained. It contained only a few pores and it had a unit weight of 690 kg/m³ immediately after it had been produced. This comparison experiment clearly shows the advantage of using the amphiphilous component (c) according to the invention.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for producing an inorganic-organic plastic of high strength, elasticity, dimensional stability to heat, and flame resistance, comprising a polyureapolysilicic acid composite material in the form of a solid/solid xerosol, which process comprises mixing:
   A. an organic polyisocyanate or polyisothiocyanate;
   B. an aqueous alkali metal silicate solution containing 20–70% by weight of said alkali metal silicate, or an aqueous silica sol, and
   C. an organic additive, and
allowing the resultant mixture to react, wherein said organic additive contains from 1 to 9 carbon atoms has a molecular weight of from 32 to 400 and is selected from the group consisting of monoalcohols, monothioalcohols, monophenols, monothiophenols, halomethyl group containing compounds, nitriles, esters, ethers, thioethers, ketones, nitro-group containing compounds, monocarboxylic acid chlorides, monocarboxylic acid bromides, monosulphonic acid chlorides, monocarboxylic acids or salts thereof, monosulphonic acids or salts thereof, and aldehydes, with the proviso that when said organic additive is a monoalcohol, monothioalcohol, monophenol, monothiophenol or monocarboxylic acid, said mixing of (A), (B) and (C) takes place substantially simultaneously.

2. The process of claim 1, wherein said organic additive is selected from the group consisting of monoalcohols, monocarboxylic acids or salts thereof, and monosulphonic acids or salts thereof.

3. The process of claim 1, wherein said organic additive is selected from the group consisting of methanol, ethanol, propanol, isopropanol, butanol, isobutanol, t-butyl alcohol, isomeric pentanol, isomeric hexanols, isomeric heptanols, cyclohexanol, methylcyclohexanol, benzyl alcohol, cyclohexano-methanol, methallylalcohol, butylmercaptan, phenol, cresol, thiophenol, thiocresol; ethyl chloride, ethyl bromide, ethyl iodide, n-propyl chloride, n-propylbromide, n-propyliodide, isopropyl chloride, isopropyl bromide, isopropyl iodide, butyl chloride, butyl bromide, butyl iodide, benzyl halides, hexahydrobenzyl-halides, cyclohexanomethyl chloride, epichlorohydrin, 2-ethyl-2-chloromethyl-oxetane and 2-ethyl-2-chloro-methyloxetane; acetonitrile, propionitrile, butyronitrile, benzonitrile, tolunitrile, hexahydrobenzonitrile, acrylonitrile, allylnitrile, methallylnitrile, methacrylonitrile; methyl acetate, ethyl acetate, propyl acetate, butyl acetate, amyl acetate, the methyl and ethyl esters of propionic, butyric, pentanoic, hexanoic and heptanoic acid and the corresponding isomeric compounds; methyl ether ether, cyclohexyl methyl ether, methyl butyl ether, phenol methyl ether, thiophenol methyl ether, cresol methyl ether, tetrahydrofuranomethyl-methyl ether, methyl ethyl ketone, methyl-isopropyl ketone, methylisobutyl ketone, methyl-isoamyl ketone, methyl-n-propyl ketone, methyl-n-butyl ketone, methyl-t-butyl ketone, methyl-furanyl ketone, methyl-tetrahydrofuranyl ketone, methyl-heptyl ketone, ethylhexyl ketone, acetophenone, ω-chloroacetophenone, propiophenone; nitromethane, nitroethane, nitrohexane, nitrobenzene, chlorinated nitrobenzenes, nitrocyclohexane, brominated nitrobenzenes, benzyl nitrate, nitrotoluene; acetyl chloride, propionic acid chloride, acetyl bromide, acid chlorides of $C_4$-$C_6$ monocarboxylic acids, methane sulphonic acid chloride, benzenesulphonic acid chloride, p-toluenesulphochloride, o-toluenesulphochloride, carbamic acid chlorides, phenylcarbamic chloride; formic acid, acetic acid, propionic acid, butyric acid, isobutyric acid pentanoic acid, hexane carboxylic acid, heptane carboxylic acid, cyclohexane carboxylic acid, benzoic acid, toluic acid; methanesulphonic acid, ethanesulphonic acid, butanesulphonic acid, benzenesulphonic acid, 2-toluenesulphonic acid, 4-toluene-sulphonic acid, chlorosulphonic acid esters and sulphonic acid esters; formaldehyde, acetaldehyde, propionaldehyde, butyl aldehyde, pentanals, hexanals, heptanals, octanals, and the corresponding semi-acetals and full acetals.

4. The process of claim 1, wherein component (C) contains a functional group corresponding to one of the following general formulae:
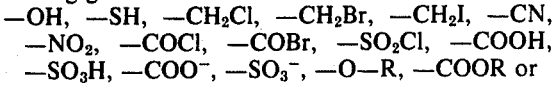
—$SO_3H$, —$COO^-$, —$SO_3^-$, —O—R, —COOR or

wherein R is $CH_3$— or $C_2H_5$.

5. The process of claim 1, wherein methanol is component (C).

6. The process of claim 1, wherein from 20% to 54% aqueous silicate solution or silica sol is used as component (B) and the proportion by weight of component (A) to component (B) is from 70:30 to 20:80.

7. The process of claim 1, wherein component (C) is used in a quantity of from 1% to 30% by weight, preferably from 2% to 20% by weight, based on component (A).

8. The process of claim 1, wherein in addition to the polyisocyanate, other hardeners are used for the silicate which is water-soluble or dispersed in water.

9. The process of claim 1, wherein from 0% to 50% by weight, based on the reaction mixture, of a chemically inert blowing agent boiling within the range of from −25° to 80°C is added.

10. The process of claim 1, wherein the reaction is accompanied by foaming.

11. The process of claim 1, wherein the mixture contains from 0.001 to 10% by weight, based on the reaction mixture of an activator.

12. The process of claim 1, wherein the mixture contains from 0 to 20% by weight, based on the reaction mixture of a foam stabilizer.

13. The process of claim 1, wherein the mixture contains from 0 to 20% by weight, based on the reaction mixture of an emulsifying agent.

14. The process of claim 1, wherein inorganic or organic particulate or pulverulent materials are added to the reaction mixture.

15. The process of claim 1, wherein the organic polyisocyanate is a phosgenation product of aniline-formaldehyde condensation.

16. The product of the process of claim 1.

17. An inorganic-organic plastic having high strength, elasticity, dimensional stability with increase in temperature and flame resistance prepared by the process which comprises substantially simultaneously mixing and reacting an organic polyisocyanate or polyisothiocyanate, an aqueous alkali metal silicate and an organic additive selected from the group consisting of monoalcohols, monothioalcohols, monophenols, and monothiophenols, said organic additive having a molecular weight of up to about 400, said inorganic-organic plastic being the solid/solid xerosol.

* * * * *